United States Patent
Kim et al.

(10) Patent No.: US 7,749,475 B2
(45) Date of Patent: Jul. 6, 2010

(54) METHOD FOR SEPARATION AND RECYCLE OF PURE SULFUR DIOXIDE FROM A GASEOUS MIXTURE IN IS CYCLE WITH IONIC LIQUIDS

(75) Inventors: Chang Soo Kim, Daegu (KR); Gyeong Taek Gong, Seoul (KR); Kye Sang Yoo, Seongbuk-gu (KR); Byung Gwon Lee, Seoul (KR); Kwang Deog Jung, Seoul (KR); Hong Gon Kim, Seoul (KR); Byoung Sung Ahn, Seoul (KR); Oh Shim Joo, Seoul (KR)

(73) Assignee: Korea Institute of Science and Technology, Seongbuk-gu (KR)

( * ) Notice: Subject to any disclaimer, the term of this patent is extended or adjusted under 35 U.S.C. 154(b) by 0 days.

(21) Appl. No.: 12/375,812

(22) PCT Filed: Dec. 21, 2007

(86) PCT No.: PCT/KR2007/006732

§ 371 (c)(1),
(2), (4) Date: Jan. 30, 2009

(87) PCT Pub. No.: WO2008/123651

PCT Pub. Date: Oct. 16, 2008

(65) Prior Publication Data

US 2010/0015040 A1 Jan. 21, 2010

(30) Foreign Application Priority Data

Apr. 9, 2007 (KR) ...................... 10-2007-0034777

(51) Int. Cl.
*C01B 17/48* (2006.01)
*C01B 17/56* (2006.01)

(52) U.S. Cl. .................. 423/242.7; 423/648.1; 423/481; 423/500; 423/522; 423/539; 423/542; 423/579

(58) Field of Classification Search .............. 423/648.1, 423/481, 500, 522, 539, 542, 579, 242.7
See application file for complete search history.

(56) References Cited

U.S. PATENT DOCUMENTS

| | | | |
|---|---|---|---|
| 3,904,735 | A | 9/1975 | Atwood et al. |
| 4,067,703 | A | 1/1978 | Dullien et al. |
| 4,089,940 | A | 5/1978 | Norman et al. |
| 5,019,361 | A | 5/1991 | Hakka |
| 5,292,407 | A | 3/1994 | Roy et al. |
| 2003/0085156 | A1 | 5/2003 | Schoonover |

FOREIGN PATENT DOCUMENTS

| | | |
|---|---|---|
| JP | 2007-084394 | 4/2007 |
| KR | 10-2006-0119532 A | 11/2006 |

OTHER PUBLICATIONS

Jessica L. Anderson et al. "Measurement of SO2 Solubility in Ionic Liquids" The Journal of Physical Chemistry B, vol. 110, No. 31, pp. 15059-15062 (Jul. 15, 2006).*
Weize Wu et al. "Desulfurization of Flue Gas: SO2 Absorption by an Ionic Liquid" Angewandte Chemie Int. Ed., vol. 43, pp. 2415-2417 (2004).*

* cited by examiner

*Primary Examiner*—Timothy C Vanoy
(74) *Attorney, Agent, or Firm*—Frommer Lawrence & Haug LLP; Ronald R. Santucci

(57) ABSTRACT

The present invention relates to a method for separation and recycling of pure sulfur dioxide from a gaseous mixture in the IS cycle. More specifically, the present invention relates to a method for separation and recycling of pure sulfur dioxide from a gaseous mixture in the IS cycle using an ionic liquid under a specific condition. When compared with the conventional amine-based absorbent, the use of the ionic liquid enables continuous absorption and stripping of $SO_2$ even at high temperature, and enables a reversible absorption of $SO_2$ without loss, decomposition or degradation of a solvent due to good chemical stability, thereby enabling separation and recycling of pure $SO_2$ from a gaseous mixture in the IS cycle.

10 Claims, 3 Drawing Sheets

METHOD FOR SEPARATION AND RECYCLE OF PURE SULFUR DIOXIDE FROM A GASEOUS MIXTURE IN IS CYCLE WITH IONIC LIQUIDS

This application is a 371 of PCT/KR2007/006732 filed on Dec. 21, 2007, published on Oct. 16, 2008 under publication number WO 2008/123651 A1 which claims priority benefits from South Korean Patent Application Number 10-2007-0034777 filed Apr. 9, 2007, the disclosure of which is incorporated herein by reference.

TECHNICAL FIELD

The present invention relates to a method for separation and recycling of pure sulfur dioxide from a gaseous mixture in the iodine-sulfur (IS) cycle using an ionic liquid under a specific condition. When compared with the conventional amine-based absorbent, the use of the ionic liquid enables continuous absorption and stripping of sulfur dioxide ($SO_2$) even at high temperature and enables a reversible absorption of $SO_2$ without loss, decomposition or degradation of a solvent due to good chemical stability, thereby enabling separation and recycling of pure $SO_2$ from a gaseous mixture in the IS cycle.

BACKGROUND ART

The three reactions of the IS cycle, which is disclosed in U.S. Pat. No. 4,089,940, are as follows:

$$H_2SO_4 \rightarrow SO_2 + H_2O + 1/2 O_2$$

$$SO_2 + I_2 + 2H_2O \rightarrow 2HI + H_2SO_4$$

$$2HI \rightarrow I_2 + H_2$$

The decomposition of sulfuric acid into sulfur dioxide and oxygen is performed at about 700° C. or above. Sulfur dioxide reacts with iodine and water (Bunsen reaction) to produce hydrogen iodide and sulfuric acid. Sulfuric acid is recycled to the sulfuric acid decomposition reaction. Hydrogen iodide is separated and decomposed in a hydrogen iodide reactor to generate hydrogen and iodine. Iodine is recycled to the Bunsen reactor. As a whole, this process is a closed cycle whose net reactant is water and whose net products are hydrogen and oxygen.

As described, in the process of absorption, separation and stripping of $SO_2$ at high temperature in the thermochemical hydrogen production by the IS cycle, $SO_2$ produced from the decomposition of $H_2SO_4$ is separated and recycled as a reactant to the Bunsen reaction (120° C.). Unlike the conventional desulfurization from the exhaust gases, reversible absorption of $SO_2$ is essential in this process because $SO_2$ is recycled. The recovered $SO_2$ gas should be pure not containing solvent vapor, and the stripping of $SO_2$ at high temperature should occur continuously and stably for the better thermal efficiency.

In general, $SO_2$ absorbents can be regenerated by the application of sufficient heat or chemical reagents. At present, steam stripping at about 90° C., calcination at about 900 to 1,000° C., reduction with reductants such as hydrogen, methane and carbon monoxide, reaction with lime and electrodialysis/oxidation are known.

Various absorbents have been used as $SO_2$ absorbents. U.S. Pat. No. 3,904,735 describes use of triethanolamine. A variety of other amine-based compounds have been used for $SO_2$ removal. Because of the relatively high vapor pressure of amine-based compounds at high temperature, the stripping temperature of $SO_2$ should be increased around 110° C. to obtain pure $SO_2$ not containing the amine-based compounds.

According to the Waterloo scrubber process disclosed in U.S. Pat. No. 4,067,703, any amine absorbent used for $SO_2$ absorption cannot avoid the loss of solvent due to potential evaporation caused by high vapor pressure and large surface area of the absorption medium. U.S. Pat. No. 5,019,361 (Hakka) discloses the removal of $SO_2$ using a diamine compound having a $pK_a$ value of about 4.5 to 6.7. The amine salt resulting from absorption at 25 to 70° C. may be regenerated to $SO_2$ by steam in a stripper tower, as disclosed in U.S. Pat. No. 5,292,407 (Roy et al.). The degassing temperature is maintained at 100 to 110° C.

Certain problems may result from the use of the aforesaid absorbents. For example, the stripping of $SO_2$ should be performed at 100 to 110° C., and because of the high vapor pressure of the absorbents at high temperature, the purity of the recycled $SO_2$ tends to be low.

DISCLOSURE

Technical Problem

The present inventors have made extreme efforts to solve the problem that the continuous operation is difficult due to the difficulty in the recycling of absorbents and the purity of $SO_2$ during stripping is reduced due to the high vapor pressure of the absorbents at high temperature. As a result, they have found out that, through a process of reversibly absorbing, separating and stripping $SO_2$ from a gaseous mixture in the IS cycle with an inorganic liquid, at a temperature higher than the stripping temperature of conventional amine-based absorption process, $SO_2$ can be recycled continuously to the Bunsen reactor. As a result of high temperature, thermal efficiency of the process can be improved. Moreover, $SO_2$ can be absorbed reversibly without loss, decomposition or degradation of a solvent due to good chemical stability.

Technical Solution

Accordingly, an object of the present invention is to provide a method for efficient separation and recycling of pure $SO_2$ from a gaseous mixture in the IS cycle using an ionic liquid through absorption, separation and stripping.

BEST MODE

The present invention is characterized by a method for separation and recycling of pure $SO_2$ comprising the steps of: contacting a gaseous mixture discharged from sulfuric acid decomposition with an ionic liquid, thereby absorbing and separating $SO_2$ contained in the gaseous mixture by the ionic liquid; and stripping the absorbed and separated $SO_2$ from the ionic liquid.

Hereinafter the present invention will be more specifically described.

The present invention is directed to a method for separation and recycling of pure $SO_2$ from a gaseous mixture in the IS cycle through a reversible, continuous process of absorption, separation and stripping. The $SO_2$ recycled according to the present invention has purity of 98 to 99%. Overall recovery rate in the process will be 85 to 95% although it may vary depending on the absorption and stripping conditions.

The IS cycle comprises the three steps of decomposition of $H_2SO_4$, Bunsen reaction of $SO_2$ and decomposition of HI. The gaseous mixture generated by the IS cycle includes $SO_2$ and $O_2$, and is difficult to separate by a continuous separation and recycling process. Especially, separation and recycling of pure $SO_2$ with purity of 98 to 99% is not easy.

The present invention is directed to a method for continuous separation and recycling of pure $SO_2$ using an ionic liquid. A method of absorbing and separating sulfur compounds contained in petroleum hydrocarbon oils using an ionic liquid is disclosed in Korean Patent No. 2006-119532. However, the sulfur compounds separated by this method are aliphatic sulfur compounds, aromatic sulfur compounds, hydrogen sulfide ($H_2S$), carbonyl sulfide (COS), etc., thus differing from $SO_2$ of the present invention. That is, although this invention is identical with the present invention in that an ionic liquid is used to separate sulfur-containing compounds, the present invention is characterized in that $SO_2$, which is not easily separated and recycled purely by the conventional method using absorbents, is separated from a gaseous mixture.

The method for separation and recycling of $SO_2$ from a gaseous mixture in the IS cycle comprising absorption at low temperature followed by stripping at high temperature using an ionic liquid has never been attempted before in the related art. Neither, it can be easily conceived from the separation of liquid sulfur compounds by extraction using an ionic liquid.

Hereunder is given a more detailed description of the method for separation and recycling of $SO_2$ from a gaseous mixture in the IS cycle according to the present invention.

Figure 3:
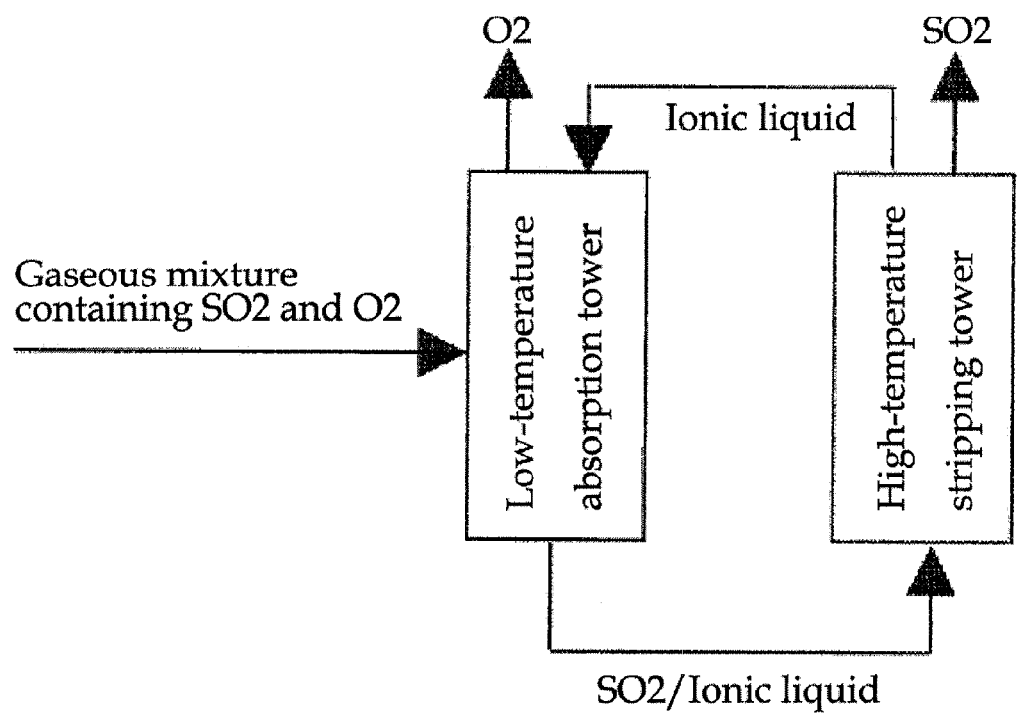
FIG. 3 schematically illustrates the continuous absorption and separation process according to the present invention.

Referring to FIG. 3, which schematically illustrates an embodiment of the present invention, there are provided a low-temperature absorption tower where $SO_2$ contained in the gaseous mixture from the IS cycle is absorbed and separated by an ionic liquid, and a high-temperature stripping tower where the absorbed $SO_2$ is degassed from the ionic liquid. Specifically, the gaseous mixture containing $SO_2$ from the IS cycle is supplied to the lower portion of the low-temperature absorption tower, and the ionic liquid is supplied to the upper portion of the absorption tower. By the counter-current flow of gases and ionic liquids from the upper and lower portions of the tower, the ionic liquid comes in contact with $SO_2$. The tower may be filled with a commonly used filler to increase the contact area thereby improving the efficiency of absorption and separation of $SO_2$.

With regard to the present invention, the IS cycle is not particularly limited. The gaseous mixture from the IS cycle may include various components. Typically, the present invention is directed to the absorption and separation of $SO_2$ from a gaseous mixture comprising 40 to 80 weight % of $SO_2$ and 20 to 60 weight % of $O_2$ as main components.

The ionic liquid may be one commonly used in the related art, and is not particularly limited. More preferably, an ionic liquid effective in absorption and separation of sulfur compounds, particularly $SO_2$, may be used. For example, an ionic compound comprising a cation selected from imidazolium, pyrrolidinium, piperidinium, morpholinium and pyridinium and an anion selected from hydrogen sulfate ($HOSO_3^-$), methyl sulfate ($CH_3OSO3-$), ethyl sulfate ($C_2H_6OSO^{3-}$), methanesulfonate ($CH_3SO^{3-}$), acetate ($CH_3COO^-$), tetrafluoroborate ($BF_4^-$), hexafluorophosphate ($PF_6^-$) and chloride ($Cl^-$) or a mixture thereof may be used. More preferably, imidazolium acetate, imidazolium chloride or a mixture thereof maybe used.

Figure 1:
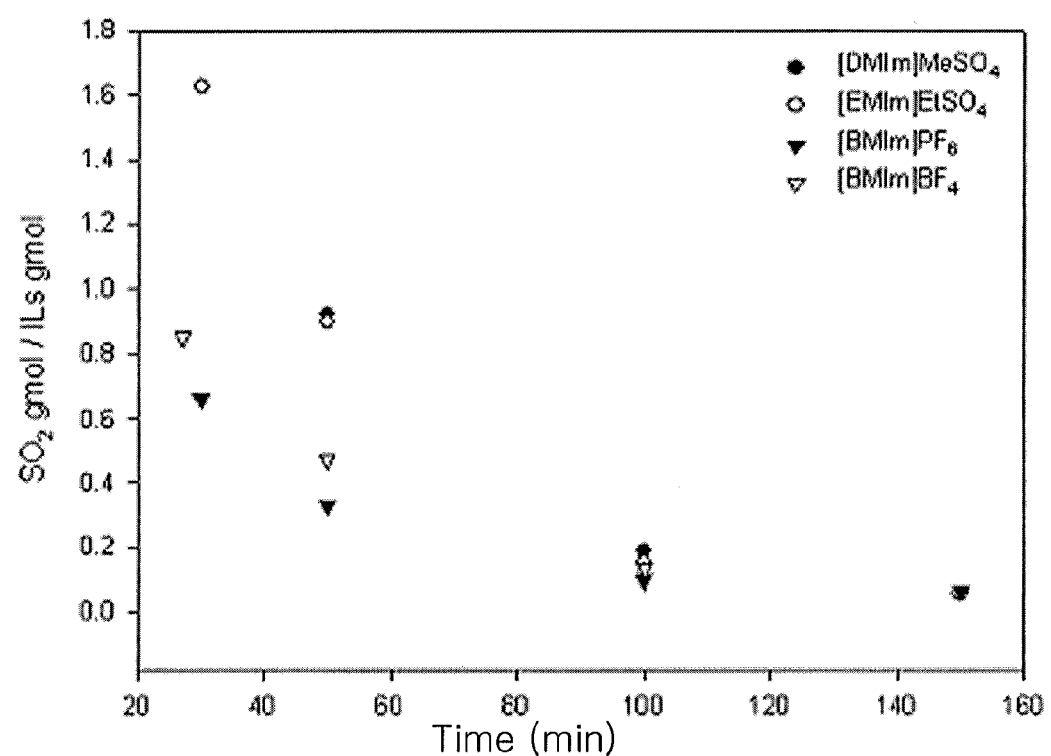
FIG. 1 shows the $SO_2$ absorption capacity of the ionic liquids according to the present invention at various temperatures (Example 3).

The absorption and separation is performed at 20 to 50° C. If the temperature is below 20° C., a large amount of refrigerant is required for cooling and heat loss may increase. Meanwhile, if temperature is higher than 50° C., the solubility of $SO_2$ in the ionic liquid decreases abruptly, resulting in very low recovery ratio, as can be seen in FIG. 1. Hence, the aforesaid range is preferred.

Then, the absorbed and separated $SO_2$ is degassed from the ionic liquid. The stripping is performed at 120 to 250° C. If the temperature is below 120° C., the conventional process of using amine and water may replace the absorption and separation. Meanwhile, if the temperature is higher than 250° C., the ionic liquid may be decomposed. Hence, the aforesaid range is preferred.

Thus obtained pure $SO_2$ has purity of 98 to 99% and overall process recovery rate of 85 to 95%, although they may vary depending on the absorption and stripping conditions. The process according to the present invention is continuously operable, provides good chemical stability, and enables a reversible absorption of $SO_2$ without loss, decomposition or degradation of a solvent.

Mode for Invention

The following examples, with reference to the above description, further illustrate the present invention, but they should not be construed as limiting the scope of the present invention.

EXAMPLE 1

A gaseous mixture from the IS cycle and an ionic liquid were supplied to an absorption tower in order to absorb and separate $SO_2$. The gaseous mixture was supplied at a rate of 60 cc/min, $SO_2$ at 20 cc/min and the carrier gas He at 10 cc/min. The absorption and separation was performed at 35° C. Subsequently, the absorbed and separated $SO_2$ was degassed from the ionic liquid, at 200° C.

In order to evaluate the effect of the anion of the ionic liquid on the absorption of $SO_2$, $SO_2$ absorption was measured using various anions (Table 1) and using 1-butyl-3-methylimidazolinium as cation. The result is given in Table 1.

TABLE 1

| Anions of ionic liquids (ILs) | $SO_2$ absorption ($SO_2$ gmole/ILs gmole) |
|---|---|
| Cl | 1.68 |
| OAc | 1.46 |
| MeSO$_3$ | 0.80 |
| BF$_4$ | 0.46 |
| MESO$_4$ | 0.42 |
| PF$_6$ | 0.33 |
| HSO$_3$ | 0.20 |
| EtSO$_4$ | 0.92 |
| MeSO$_4$ | 0.81 |

EXAMPLE 2

In order to evaluate the effect of the cation of the ionic liquid on the absorption of $SO_2$, $SO_2$ absorption was measured using various cations (Table 2) and using Cl as anion. The result is given in Table 2.

TABLE 2

| Cations of ILs | $SO_2$ absorption ($SO_2$ gmole/ILs gmole) |
| --- | --- |
| 1-Butyl-3-methylimidazolinium | 1.68 |
| 1,1-Dimethylpyrrolidinium | 0.66 |
| 1-Propyl-1-pentylpiperidinium | 0.42 |
| 1-Octylpyridinium | 0.25 |
| 1-Ethyl-1-hexylmorpholinium | 0.10 |

EXAMPLE 3

In order to evaluate the effect of temperature on the absorption of $SO_2$, $SO_2$ absorption was measured at temperatures ranging from 20 to 160° C. The result is given in Table 1. The gaseous mixture was supplied at a rate of 60 cc/min, $SO_2$ at 20 cc/min and the carrier gas He at 10 cc/min.

As shown in FIG. 1, the maximum absorption of $SO_2$ decreased as the temperature increased. Consequently, absorption at low temperature and stripping at high temperature is possible. Because most of the ionic liquids used in the present invention have decomposition temperatures higher than 250° C., stripping can be accomplished stably at around 200° C.

EXAMPLE 4

Figure 2:
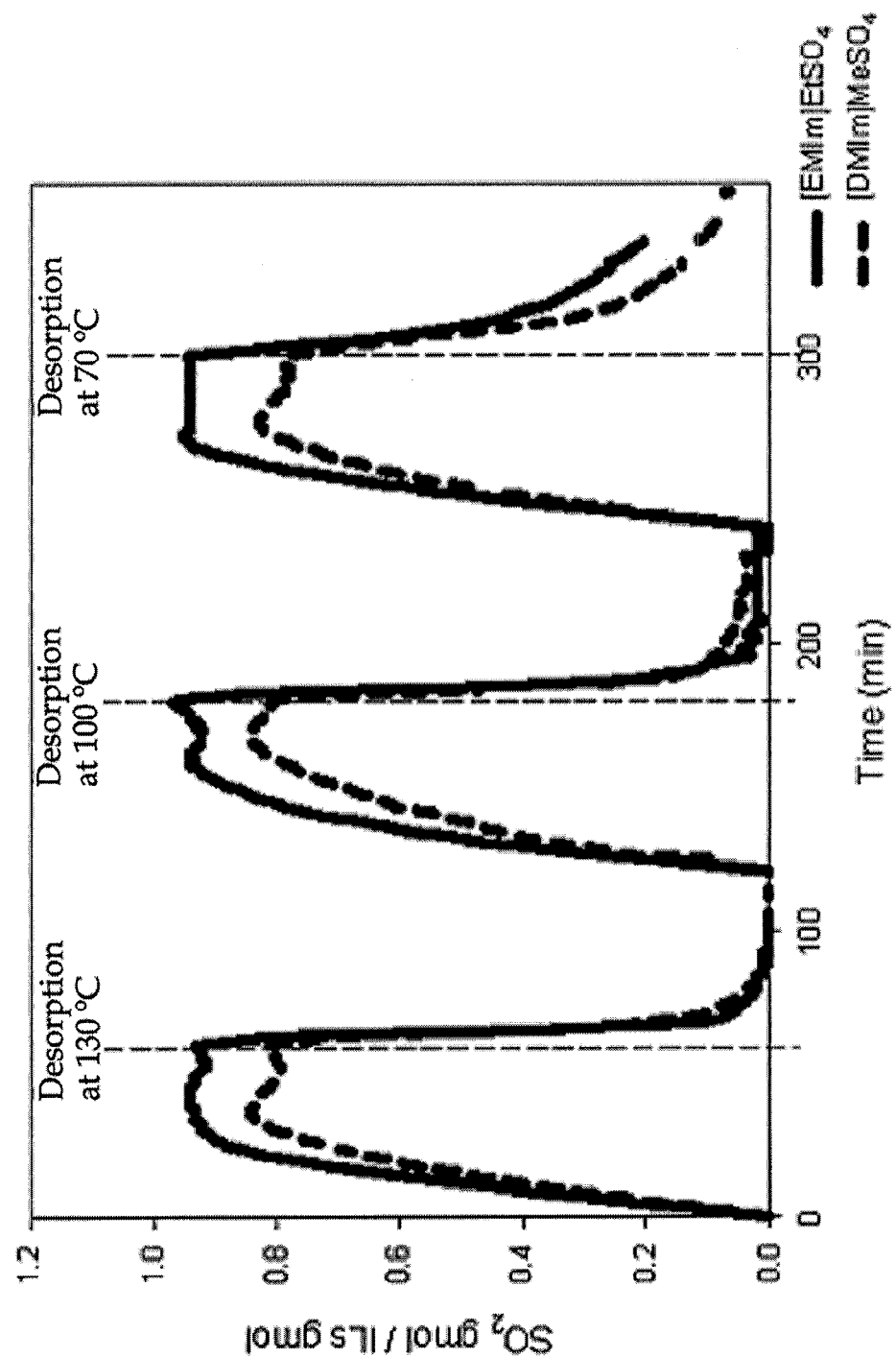
FIG. 2 shows the result of repeated absorption and stripping of $SO_2$ by the ionic liquids according to the present invention (Example 4).

In order to confirm the possibility of stable and continuous absorption and stripping, absorption and stripping of $SO_2$ was repeated for 10 times using the ionic liquids used in Example 1. As shown in FIG. 2, the efficiency of absorption and stripping was maintained constant during 10 cycles. The gaseous mixture was supplied at a rate of 60 cc/min, $SO_2$ at 20 cc/min and the carrier gas He at 10 cc/min.

As shown in FIG. 2, a stable and continuous absorption and stripping was confirmed, with the maximum absorption of $SO_2$ being maintained constant for the 10 cycles. The degassed $SO_2$ had purity of 98 to 99% and overall process recovery rate of 85 to 95%, although there was some variation depending on the stripping temperature. And, when compared with the conventional process wherein amine-based absorbents are used, there was no solvent loss even though the process was performed at high temperature, which was confirmed by the constant maximum absorption of $SO_2$.

INDUSTRIAL APPLICABILITY

As described above, the present invention provides a method capable of stably and continuously separating and recycling pure $SO_2$ from a gaseous mixture in the IS cycle using an ionic liquid at high temperature (about 200° C.). When compared with the conventional process using amine-based absorbents, the present invention is advantageous in that there is no solvent loss during repeated absorption and stripping because of low vapor pressure and good high-temperature stability of ionic liquids.

Preferred embodiments of the present invention have been described above but it is understood that various modifications can be made to the invention without deviating from its scope. Therefore, the scope of the invention should not be limited by this specific disclosure but should be ascertained from the claims which are set forth below.

The invention claimed is:

1. A method for separation and recycling of pure sulfur dioxide ($SO_2$) from a gaseous mixture in the iodine-sulfur (IS) cycle, comprising: contacting a gaseous mixture discharged from the IS cycle comprising decomposition of sulfuric acid ($H_2SO_4$), Bunsen reaction of $SO_2$ and decomposition of hydrogen iodide (HI) with an ionic liquid, thereby absorbing and separating $SO_2$ contained in the gaseous mixture by the ionic liquid; and degassing the absorbed and separated $SO_2$ from the ionic liquid.

2. The method for separation and recycling of pure $SO_2$ according to claim 1, wherein the absorption and separation of $SO_2$ is performed at 20 to 50° C.

3. The method for separation and recycling of pure $SO_2$ according to claim 1, wherein the stripping is performed at 120 to 250° C.

4. The method for separation and recycling of pure $SO_2$ according to claim 1, wherein the ionic liquid is an ionic compound comprising a cation selected from imidazolium, pyrrolidinium, piperidinium, morpholinium and pyridinium and an anion selected from hydrogen sulfate ($HOSO^{3-}$), methyl sulfate ($CH_3OSO^{3-}$), ethyl sulfate ($C_2H_6OSO^{3-}$), methanesulfonate ($CH_3SO^{3-}$), acetate ($CH_3COO^-$), tetrafluoroborate ($BF^{4-}$), hexafluorophosphate ($PF^{6-}$) and chloride ($Cl^-$) or a mixture thereof.

5. The method for separation and recycling of pure $SO_2$ according to claim 1, wherein the ionic liquid is imidazolium acetate, imidazolium chloride or a mixture thereof.

6. The method for separation and recycling of pure $SO_2$ according to claim 1, wherein the ionic liquid is used in an amount from 1.5 to 5.0 mols based on 1 mol of the gaseous mixture discharged from the IS cycle.

7. The method for separation and recycling of pure $SO_2$ according to claim 1, wherein the gaseous mixture discharged from the IS cycle includes 40 to 80 weight % of $SO_2$ and 20 to 60 weight % of oxygen (O2).

8. The method for separation and recycling of pure $SO_2$ according to claim 1, wherein the separation and recycling of $SO_2$ is performed continuously in an absorption tower and a stripping tower.

9. The method for separation and recycling of pure $SO_2$ according to claim 1, by which $SO_2$ is recycled with recovery rate of 85 to 95% and purity of 98 to 99%.

10. The method for separation and recycling of pure $SO_2$ according to claim 4, wherein the ionic liquid is imidazolium acetate, imidazolium chloride or a mixture thereof.

* * * * *